US010223876B2

(12) United States Patent
Wise et al.

(10) Patent No.: US 10,223,876 B2
(45) Date of Patent: Mar. 5, 2019

(54) TWO-WAY MERCHANDISE FIXTURE

(71) Applicant: Walmart Apollo, LLC, Bentonville, AR (US)

(72) Inventors: Lori Lee Wise, Rogers, AR (US); Tricia Mcpherson Hicks, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/017,506

(22) Filed: Jun. 25, 2018

(65) Prior Publication Data

US 2018/0308322 A1 Oct. 25, 2018

Related U.S. Application Data

(63) Continuation of application No. 15/379,099, filed on Dec. 14, 2016, now Pat. No. 10,037,659.

(60) Provisional application No. 62/270,237, filed on Dec. 21, 2015.

(51) Int. Cl.

| | |
|---|---|
| ***G01G 1/00*** | (2006.01) |
| ***G07G 1/00*** | (2006.01) |
| ***A47F 9/04*** | (2006.01) |
| ***A47F 5/10*** | (2006.01) |
| *A47F 5/13* | (2006.01) |

(52) U.S. Cl.

CPC ........... *G07G 1/0018* (2013.01); *A47F 5/103* (2013.01); *A47F 9/04* (2013.01); *G07G 1/0027* (2013.01); *A47F 5/137* (2013.01)

(58) Field of Classification Search

CPC ........................... G07G 1/0018; G07G 1/0027

USPC ........................................................ 235/7 R

See application file for complete search history.

(56) References Cited

U.S. PATENT DOCUMENTS

| | | | |
|---|---|---|---|
| 5,607,102 | A | 3/1997 | Walsh et al. |
| 8,434,630 | B2 | 5/2013 | Clark et al. |
| 8,807,356 | B2 | 8/2014 | Weigand et al. |

(Continued)

FOREIGN PATENT DOCUMENTS

| | | | |
|---|---|---|---|
| EP | 0262374 | A1 | 4/1988 |

OTHER PUBLICATIONS

Creative Store Solutions: Custom Slatwal H-Unit, 4 Sided Slatwall Gondola Display Fixtures, <http://creativestoresolutions.com/Custom-Slatwall-H-Unit.html>, last viewed Jul. 13, 2015, (3 pages).

(Continued)

*Primary Examiner* — Toan Ly

(74) *Attorney, Agent, or Firm* — McCarter & English, LLP; David R. Burns

(57) ABSTRACT

Exemplary embodiments are directed to a fixture and method for a fixture (referred to as a Two Way Fixture) displaying and holding objects for sale at a retail store. The two way fixture is includes a free-standing frame which is formed by a I-shaped base portion and a U-shaped upright portion. A pair of tempered hardboards are inserted in the middle of the U-shaped upright portion. The two way fixture has shelves and wire racks mounted to the sides of the U-Shaped upright portion. The shelves, I-shaped base portion, and wire racks create a volume allows for the two way fixture to hide or obscure the a cash box storing components of a point-of-sale (POS) station while keeping the electronic components live and updated. The two way fixture can surround the pole and the cash box without having to remove the pole or lift the bin over the cash box.

15 Claims, 13 Drawing Sheets

(56) References Cited

U.S. PATENT DOCUMENTS

| | | | |
|---|---|---|---|
| 9,737,141 | B2 | 8/2017 | Johnson |
| 2011/0315645 | A1 | 12/2011 | Fadrowski |
| 2014/0149242 | A1 | 5/2014 | Turner, Jr. et al. |
| 2017/0076559 | A1 | 3/2017 | Osmon et al. |

OTHER PUBLICATIONS

Discount Shelving: WOW Stalwall Large Gondola Merchadiser, http://www.discountshelving.com/StoreModules/ProductDetails.aspx?ProductID=ZSMG4&CategoryID=Slatwall&SubCatID=B-Slatwall%20Displays, last viewed Jul. 13, 2015, (3 pages).

CFlex-Counter-System: Counter Systems, Grocery Stores, Merchandising Displays, <http://www.panoston.com/convenience-store/cflex-counter-system/>, last viewed Jul. 13, 2015, (2 pages).

Wilson Display Ltd. Store Fixtures: Our Products, <http://www.wilsondisplay.com/products.php>, last viewed Jul. 13, 2015, (2 pages).

Wire Display, Gridwall Rack, Wire Rack, Wire Shelf, <http://www.ec21.com/product-details/Wire-Display-Gridwall-Rack-Wire-2097624.html>, last viewed Jul. 13, 2015 (3 pages).

Anthro Coporation, A full-size mobile check-out cart, 1994-2015, (3 pages).

TWO-WAY MERCHANDISE FIXTURE

CROSS-REFERENCE TO RELATED PATENT APPLICATIONS

This application is a continuation application of U.S. patent application Ser. No. 15/379,099 filed on Dec. 14, 2016 which claims priority to U.S. Provisional Application No. 62/270,237 filed on Dec. 21, 2015. The content of each application is hereby incorporated by reference in its entirety.

BACKGROUND

Larger retail stores often include a number of point-of-sale stations to accommodate a large number of customers during peak shopping seasons. However, during off-peak shopping seasons many of these point-of-sale stations remain unused and take up space in the store.

BRIEF DESCRIPTION OF DRAWINGS

Exemplary embodiments of the present disclosure will be understood from the following detailed description when read with the accompanying Figures. In the drawings, like reference numerals refer to like parts throughout the various views of the non-limiting and non-exhaustive embodiments.

DESCRIPTION OF EXEMPLARY EMBODIMENTS

Figure 1:
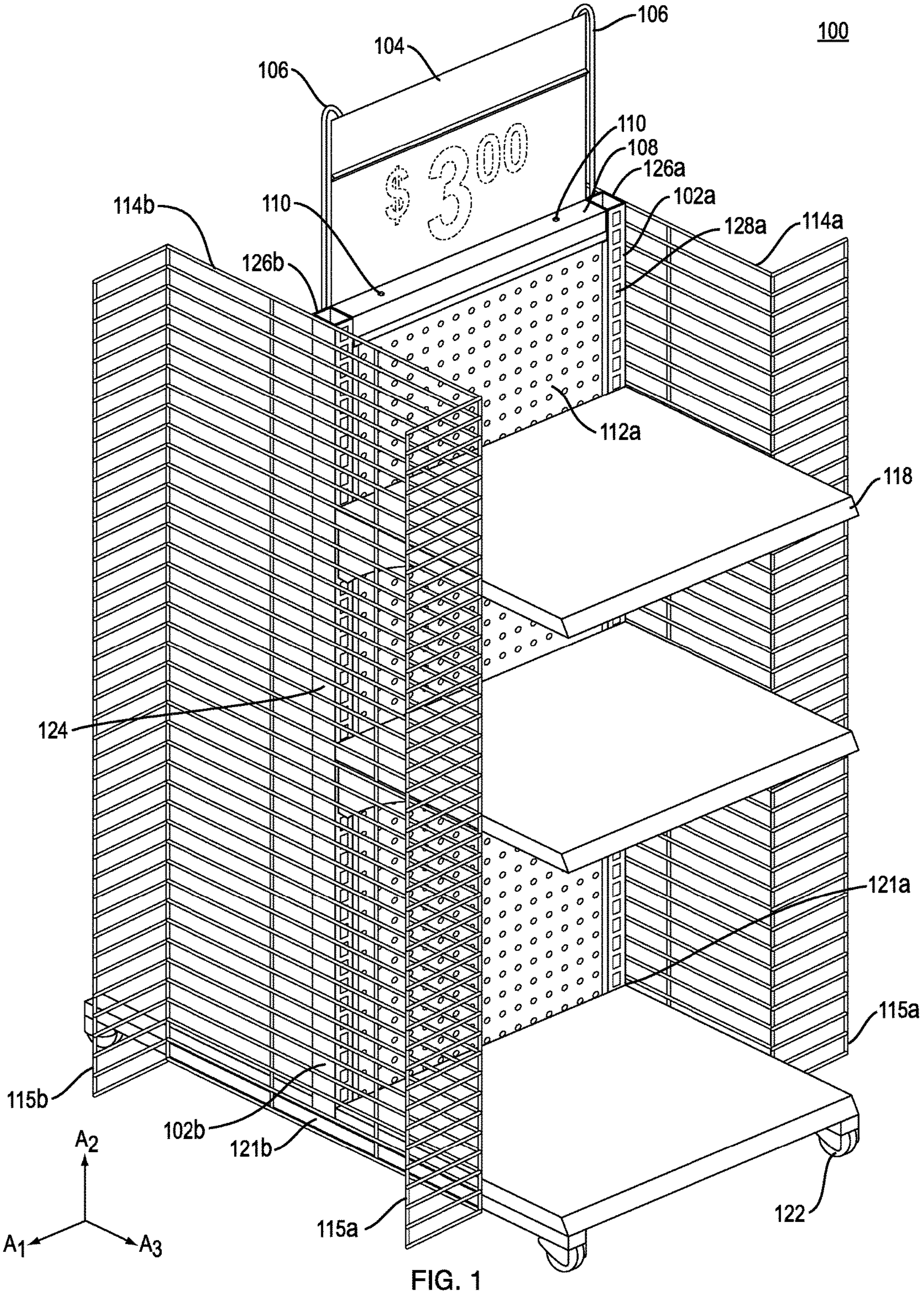
FIG. 1 illustrates a font perspective view of an assembled two-way fixture for holding and displaying merchandise according to exemplary embodiments.

The following description is presented to enable any person skilled in the art to create and use systems, assemblies and related methods associated with embodiments of fixtures for holding and displaying merchandise. Various modifications to the example embodiments will be readily apparent to those skilled in the art, and the generic principles defined herein may be applied to other embodiments and applications without departing from the spirit and scope of the present disclosure. Moreover, in the following description, numerous details are set forth for the purpose of explanation. However, one of ordinary skill in the art will realize that example embodiments of the present disclosure may be practiced without the use of these specific details. In other instances, well-known structures and processes are shown in block diagram form in order not to obscure the description of example embodiments with unnecessary detail. Thus, the present disclosure is not intended to be limited to the embodiments shown, but is to be accorded the widest scope consistent with the principles and features disclosed herein.

Described in detail herein are fixtures and assemblies for displaying merchandise. Embodiments of the fixtures can include two-way fixtures for holding and displaying merchandise. In exemplary embodiments, the fixture includes a free standing frame formed by an elongated bottom support member having a length extending along a first axis from a first end and a second end. A first upright can extend perpendicularly from the first end of the elongated bottom support member to a first terminal end along a second axis that is perpendicular to the first axis and a second upright can extend perpendicularly from the second end of the elongated bottom support member to a second terminal end along the second axis. In exemplary embodiments, the first upright can include a first pair of slots formed on the first upright between the first end and the first terminal end and the second upright can include a second pair of slots formed on the second upright between the second end and the second terminal end. Wire racks mounted to outer sides of the first and second uprights. The first pair of slots can be opposingly spaced from the second pair of slots.

In exemplary embodiments, the elongated bottom support member, the first upright and the second upright define a U-shaped structure that resides in a first plane.

In exemplary embodiments, the elongated bottom support member, defines a base configured to provide support to the U-shaped frame.

In exemplary embodiments, the fixture is dimensioned and configured to obscure a cash box of a Point-Of-Sale (POS) station.

In exemplary embodiments, the fixture can include a first panel received by a first one of the slots of the first pair of slots and a first one of the slots of the second pair of slots. A second panel can be received by a second one of the slots of the first pair of slots and a second one of the slots of the second pair of slots. An elongated cap member configured to be secured to the first terminal end of the first upright and the second terminal end of the second terminal upright such that he first and second pairs of slots of the first and second uprights and the elongated cap member secure the first and second panels to the free standing frame.

In exemplary embodiments, a shelf removable can be secured to and span between the first and second uprights, such that a shelf width corresponds to a distance between the first and second uprights. A depth of the shelf corresponds to a width or length of a cashbox such that when the first panel is positioned adjacent to the cash box, the first and second wire racks and the shelf create a volume under the shelf that encompasses the cash box.

In exemplary embodiments a point-of-sale (POS) station can be disassembled. The POS station can include a POS controller, one or more peripheral electronic components in communication with the POS controller, and non-electronic components. The non-electronic components can include a cashbox secured to a sales floor, which is formed by opposing side walls, a back wall, and a top wall, and can include an interior cavity accessible via an open front face of the cashbox. In exemplary embodiments, at least some of the plurality of non-electronic components can be removed from the sales floor while the cash box remains on and secured to the sales floor. In exemplary embodiments, the POS controller and the one or more peripheral electronic components in communication with the POS controller can be stored within the interior cavity of the cashbox when the POS station is disassembled. In exemplary embodiments, the fixture can be slid laterally with respect to the cash box secured to the sales floor so that the one of the panels of the fixture can be positioned adjacent to the cashbox and the cashbox is disposed within a volume defined by wire racks and the panel of the fixture.

In exemplary embodiments, to assemble the fixture, the first and second uprights are displaced outwardly away from each other and the panels are inserted between the first and second uprights of the U-shaped upright frame portion. The first and second uprights can be urged towards each other so that the first and second panels are received in the first and second pairs of slots.

In exemplary embodiments, the first and second panels are parallel to each other when they are secured to the U-shaped upright frame portion and/or are spaced away from each other.

In exemplary embodiments, each of the first and second panels are configured to receive one or more hooks for displaying merchandise.

In exemplary embodiments, the first upright includes a first plurality indexed apertures and the second upright includes a second plurality of apertures, and the method further comprises securing a shelf to the first upright and the second upright, a portion of the shelf being received by one of the first plurality of indexed apertures and one of the second plurality of indexed apertures.

Figure 2:
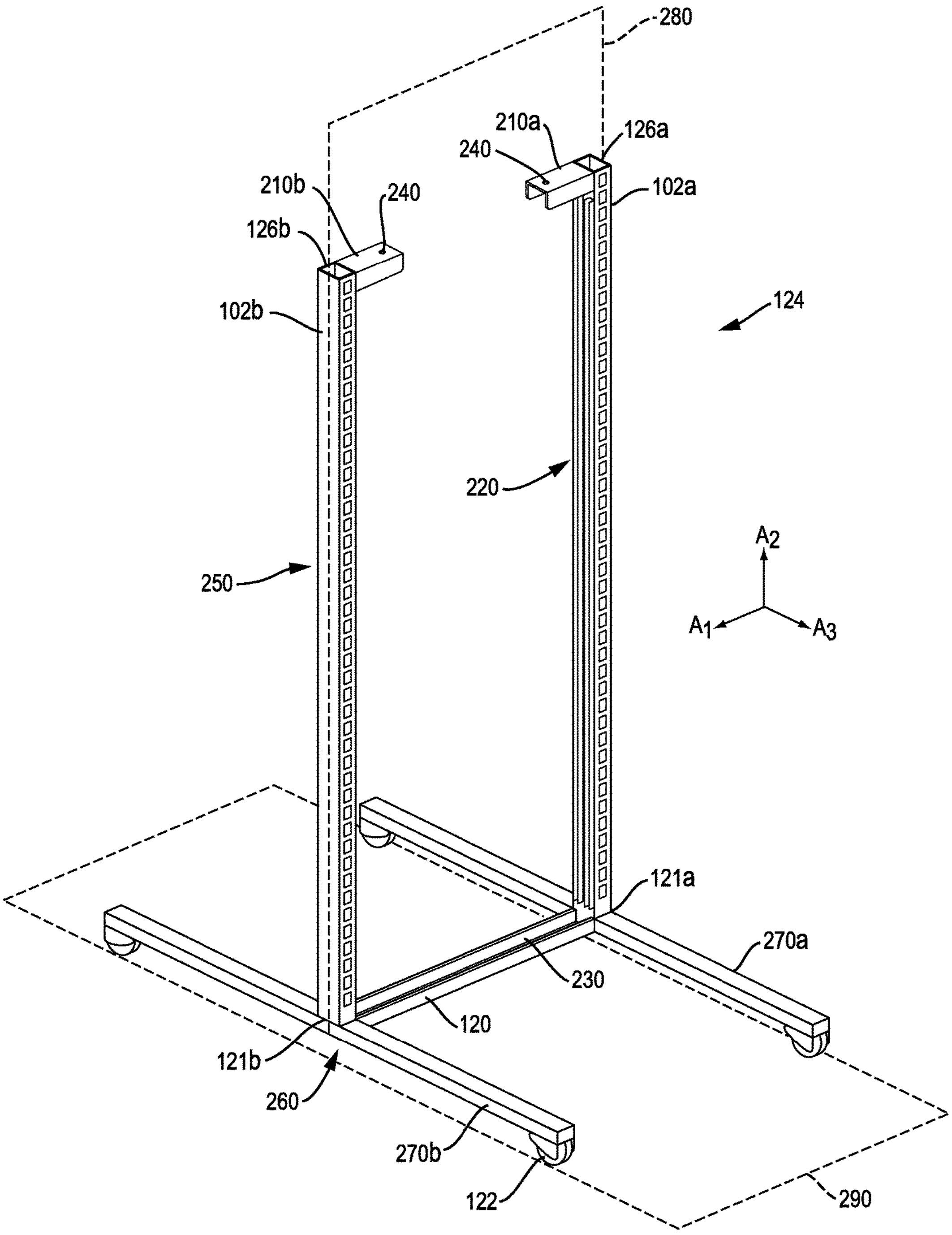
FIG. 2 illustrates a front perspective view of a free standing frame of the two-way fixture according to exemplary embodiments.

FIG. 1 illustrates a font perspective view of an assembled two-way fixture 100 for holding and displaying merchandise according to exemplary embodiments. FIG. 2 illustrates a front perspective view of a free standing frame 124 of the two-way fixture 100 according to exemplary embodiments. As shown in FIGS. 1 and 2, the free standing frame 124 can be formed by an elongated bottom support member 120 having a length extending along a first axis $A_1$ from a first end 121*a* and a second end 121*b*, a first upright 102*a* extending perpendicularly from the first end 121*a* of the elongated bottom support member 120 to a first terminal end 126*a* along a second axis $A_2$ that is perpendicular to the first axis $A_1$. In exemplary embodiments, the fixture 100 includes a second upright 102*b* extending perpendicularly from the second end 121*b* of the elongated bottom support member 120 to a second terminal end 126*b* along the second axis $A_2$. The first and second upright 102*a-b* are opposingly spaced from each other. A first wire rack 114*a* can be mounted to an outer side of the first upright 102*a* and a second wire rack 114*b* can be mounted to an outer side of the second upright 102*b*. A width of the wire racks 114*a-b* extend along the second axis $A_2$.

In exemplary embodiments, wire racks 114*a-b* have a height that extends from the elongated bottom support member 120 to the terminal ends 126*a-b* of the uprights 102*a-b*, respectively. The wire racks 114*a-b* can have a cross wire grated grid, configured to support merchandise or attachments for merchandise (e.g., hooks). The wire racks 114*a-b* may have a side portion extending along the axis $A_1$ from each vertically extending side . For example, a first side portion 115*a* extends perpendicularly from the first end of the wire rack 114*a* or 114*b* and a second side portion 115*b* extends perpendicularly from the second end of wire rack 114*a* or 114*b*.

In exemplary embodiments, a base of the fixture 100 can be formed by the elongated support member 120 and legs 270*a-b* (as shown in FIG. 2) disposed at the first end 121*a* and the second end 121*b* of the elongated support member 120. The legs 270*a-b* (as shown in FIG. 2) can extend perpendicularly with respect to the length of the elongated support member 120. In exemplary embodiments, wheels 122 may be affixed to the ends of each of the legs 270*a-b* (as shown in FIG. 2) .

In exemplary embodiments, the fixture 100 may include a first panel 112*a* and a second panel 112*b* (shown in FIG. 4) disposed between the first and second uprights 102*a-b* and supported by the elongated support member 120. Each of the panels 112*a-b* can have a height that extends vertically along the second axis $A_2$, and a width that extends horizontally along the first axis $A_1$. In exemplary embodiments the panels 112*a-b* may be peg boards. The panels 112*a -b* can be secured to the fixture by the uprights 102*a-b* and an elongated cap member 108 secured to the terminal ends 126*a-b* of the uprights 102*a-b* at a top of the fixture. In exemplary embodiments, the elongated cap member 108 may have apertures 110.

In exemplary embodiments, shelves 118 can be removably secured to the first and second uprights 102*a-b*, such that the shelf has a width that spans between the first and second uprights 102*a-b* (i.e. corresponding to a distance between the first and second uprights 102*a-b*). The first upright 102*a* can have a first plurality of indexed apertures 128a and the second upright 102*b* can have a second plurality of indexed apertures 128b extending along the uprights 102*a-b*. A portion of shelves 118 may be received by the indexed apertures 128*a-b* to secure the shelves 118 to the uprights 102*a-b*. The shelves 118 may extend perpendicular with respect to the uprights 102*a-b* and the panel 112*a* (along a third axis $A_3$). The shelves 118 may be configured to support and display merchandise.

In exemplary embodiments, the fixture 100 may include a signage board 104. The signage board 104 may extend vertically from the top of the free standing frame 124 along the second axis $A_2$. The signage board 104 may extend along the first axis $A_1$ from the first upright 102*a* to the second upright 102*b*. The signage board 104 may be secured to the fixture 100 using poles 106 at both ends of the signage board.

Figure 3:
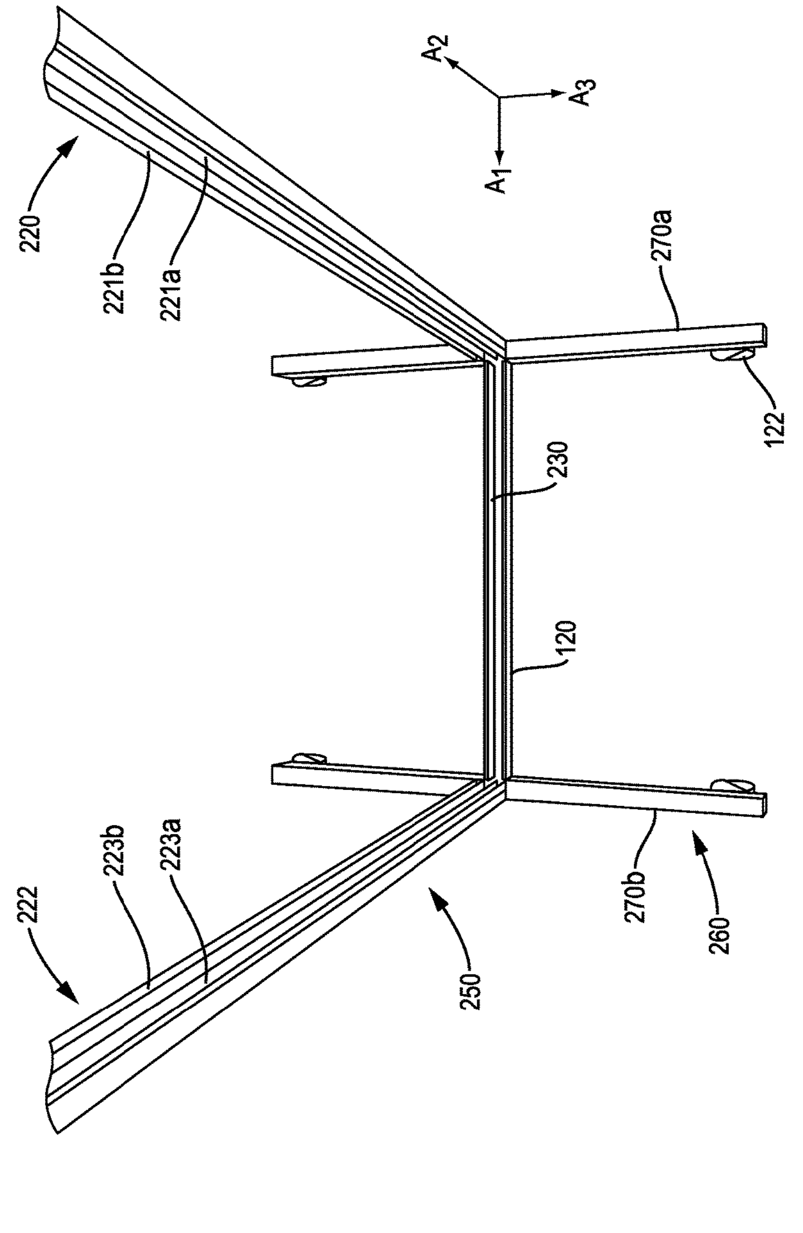
FIG. 3 illustrates a top perspective view of the free standing frame shown in FIG. 2.

Referring now to FIG. 2 and FIG. 3, the free standing frame 124 may include a U-shaped upright frame portion 250 formed by the elongated support member 120 and the uprights 102*a-b*, where a length of the uprights 102*a-b* extend vertically along the second axis $A_2$ and a length of the elongated base member 120 extends along the first axis $A_1$ between the first and second upright 102*a-b*. The elongated base member 120 and the uprights 102*a-b* of the U-shaped upright frame portion 250 are disposed in the a plane that extends parallel to the first and second axes $A_1$ and $A_2$.

In exemplary embodiments, the first upright 102*a* can have a first pair of slots 220 (including slots 221*a-b*) disposed along the inner area of the first upright 102*a* and the second upright 102*b* can include a second pair of slots 222 (including slots 223*a-b*) corresponding to and opposingly aligned with the first pair of slots 220. The pairs of slots 220, 222 can be disposed on an inner side of the uprights 102*a-b*, respectively. The pairs of slots 220 and 222 extend from the elongated support member 120 to the terminal ends 126*a-b* of the upright 102*a-b*, respectively. The slots 221*a* and 223*a* may be configured to receive the first panel 112*a* (as shown in FIG. 1) and the slots 221*b* and 223*b* may be configured to receive the second panel 112*b*. In exemplary embodiments, the elongated support member 120 of the U-shaped upright frame portion 250 may include a protruding member 230, which can serve as a spacer to maintain and reinforce a separation of the panels 112*a-b* at a bottom of the fixture 100. The protruding member 230 may extend along the first axis $A_1$ spanning the length of the elongated support member.

In some embodiments, the first upright 102*a* can include a first flange 210*a* extending perpendicularly from the first terminal end 126*a* of the first upright 126*a* along the first axis $A_1$, and the second upright 102*b* can include a second flange 210*b* extending perpendicularly from the second terminal end of the second upright 126*b* along the first axis $A_1$. In exemplary embodiments, the flanges 210*a-b* may include apertures 240 disposed on the top of the flanges. In exemplary embodiments, the uprights 102*a-b*, the elongated support member 120 and the flanges 210*a-b* may be on the same plane. While an example embodiment is shown including flanges 210*a-b*, exemplary embodiments of the fixture can be formed without flanges 210*a-b*, as described herein.

In exemplary embodiments, the free standing frame 124 may include a I-shaped base portion 260 formed by the elongated support member 120, the first leg 270*a* extending perpendicularly with respect to the first end 121*a* of the elongated bottom support member 120 along the third axis $A_3$ that is perpendicular to the first and second axes $A_1$, and $A_2$ and the second leg 270*b* extending perpendicularly with respect to the second end 121*b* of the elongated bottom support member 120 along the third axis $A_3$. The legs 270*a-b* may include wheels/castors 122 disposed at both ends of the legs 270*a-b*. In exemplary embodiments the I-shaped base portion is in a second plane defined by the first and third axes $A_1$ and $A_3$ , which extends perpendicularly to the plane within which the U-shaped upright frame portion 250 resides.

Figure 4:
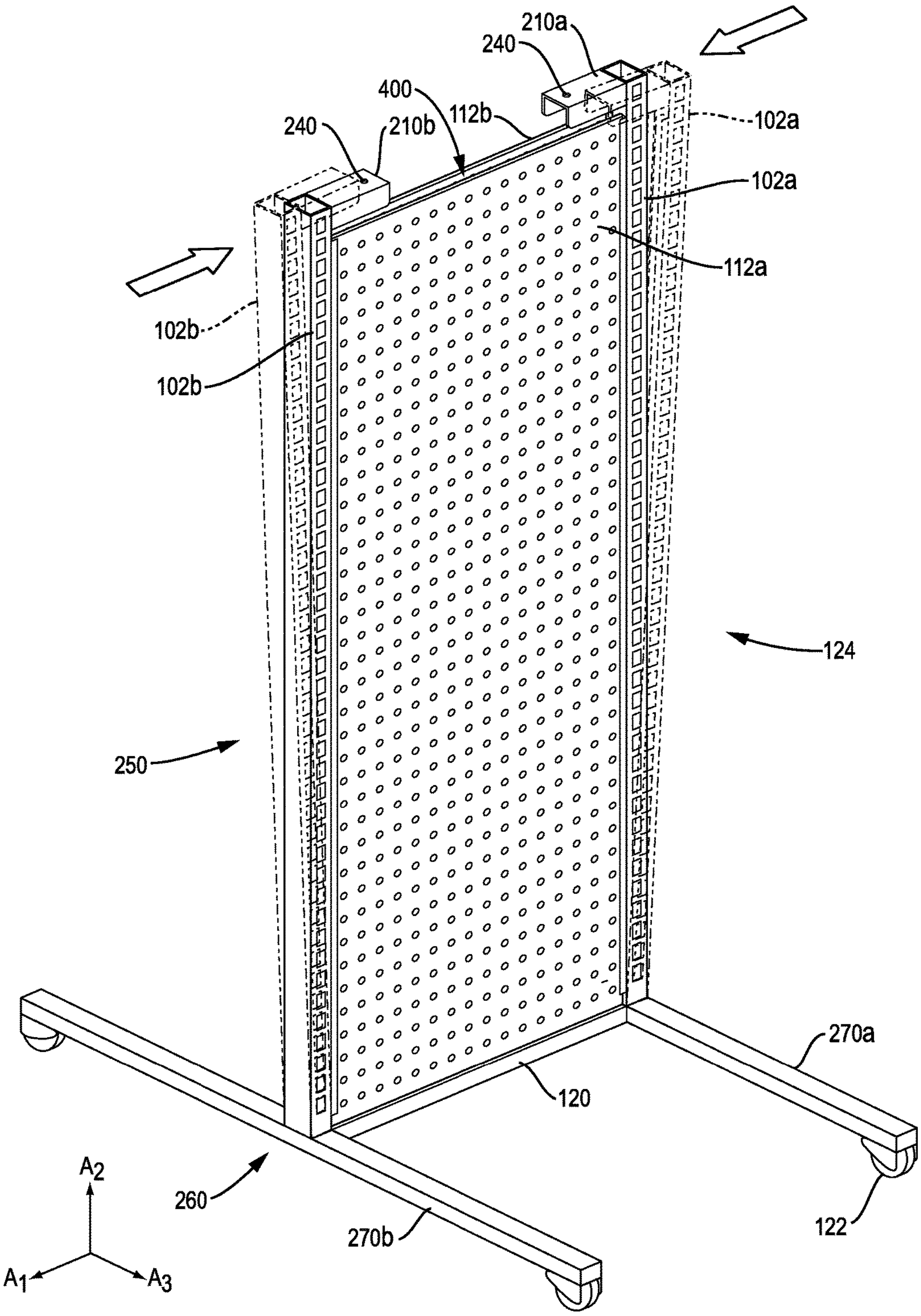
FIG. 4 illustrates a front perspective view showing panels inserted between opposingly spaced uprights of the free standing frame according to exemplary embodiments.

FIG. 4 illustrates a front perspective view showing the panels 112*a* and 112*b* inserted between the opposingly spaced uprights 102*a-b* of the free standing frame 124 according to exemplary embodiments. In exemplary embodiments, the first and second panel 112*a-b* may be inserted in the U-shaped upright frame portion 250 by displacing the first and second uprights 102*a-b* outwardly away from each other. The first and second panel 112*a-b* may be inserted between the first and second upright 102*a-b* so that the panels 112*a-b* are aligned with and at least partially received by the slots 221*a* and 223*a* and the slots 221*b* and 223*b*, respectively. The first and second uprights 102*a-b* may be urged towards each other so that the first and second panels 112*a-b* are received in the first and second pairs of slots 220 and 222. In exemplary embodiments, when the first and second uprights 102*a-b* urged inwardly such that a length of the first and second uprights 102*a-b* are parallel to the second axis $A_2$ and the first and second flanges 210*a-b* extend parallel to the first axis $A_1$ the vertically extending sides of the first panel 112*a* can fully engage the slots 221*a* and 223*a* and the vertically extending sides of the second panel 112*b* can fully engage the slots 221*b* and 223*b* such that the slots 221*a* and 223*a* retain the first panel 112*a* and the slots 221*b* and 223*b* retain the second panel 112*b*. When the panels 112*a* and 112*b* are retained by the first and second pairs of slots 220 and 22, the panels 112*a* and 112*b* can be parallel to, and spaced away from, each other such that a cavity 400 is formed between the first and second panels 112*a* and 112*b*.

Figure 5:
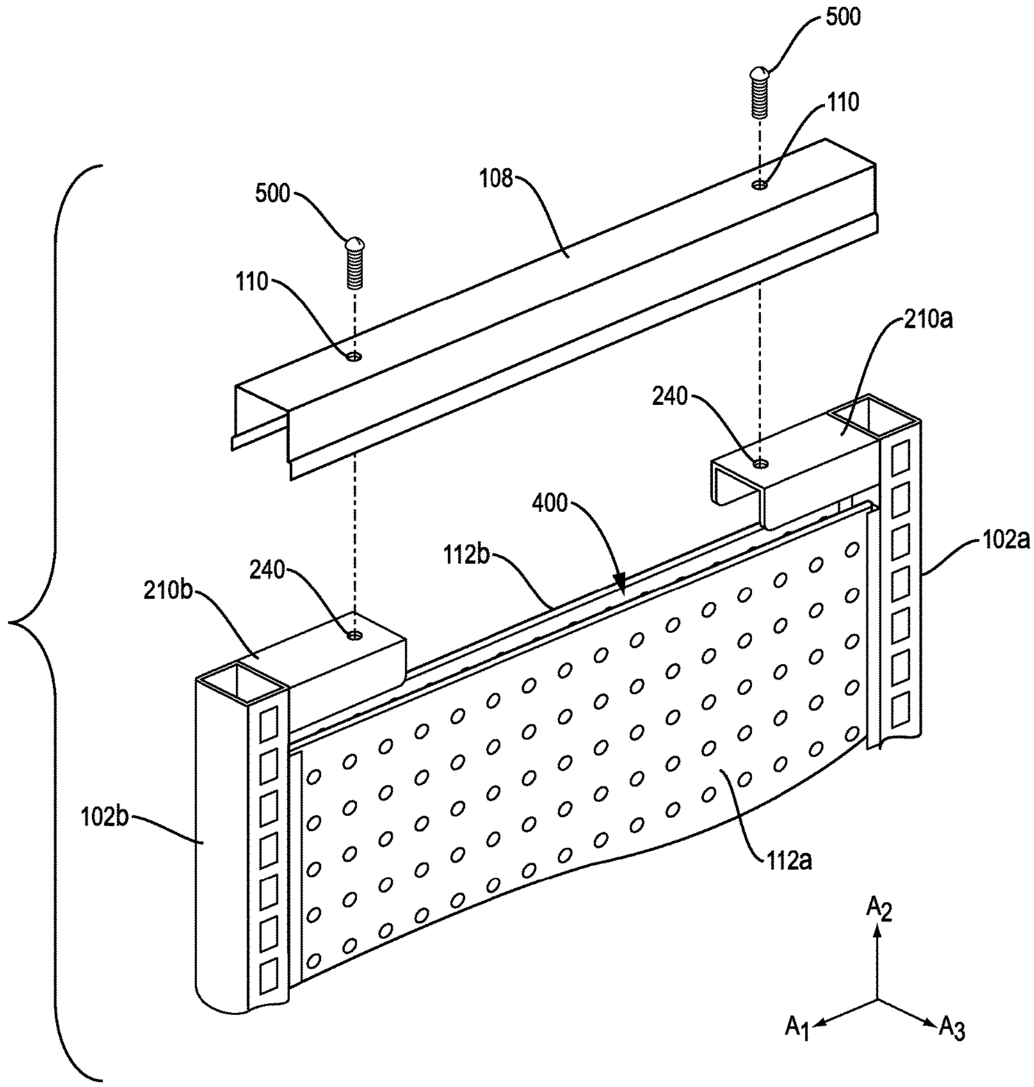
FIG. 5 illustrates a partially exploded front perspective view of a top portion of the two-way fixture according to exemplary embodiments.

FIG. 5 illustrates a partially exploded front perspective view of a top portion of the two-way fixture according to exemplary embodiments. In exemplary embodiments, the elongated cap member 108 may secure the first and second panels 112*a-b* to the U-shaped upright frame portion 250. In an example embodiment, the elongated cap member 108 may be placed on top of the flanges 210*a-b* parallel to the first axis $A_1$. The elongated cap member can have open ends for receiving the first and second flanges 210*a-b* and two downwardly depending flanges extending parallel to each other between the open ends. The first flange 210*a* may be inserted into a first opening 502*a* of an elongated cap member 108 and the second flange 210*b* may be inserted into a second opening 502*b* of the elongated cap member 108. In exemplary embodiments, apertures 240 on the flanges 210*a-b* and the apertures 110 on the elongated cap member 108 can be aligned when the flanges 210*a-b* are inserted in the openings 502*a-b* of the elongated cap member 108. The elongated cap member 108 may be secured to the first and second flanges 210*a-b* to lock the first and second panels in position by inserting screws 500 through the apertures 240 on the flanges 210*a-b* and the apertures 110 on the elongated cap member 108. In exemplary embodiments, the first and second panels 112*a-b* may be parallel to each other along the third axis $A_3$, when secured to the U-shaped upright frame portion 250. In exemplary embodiments, the first and second panels 112*a-b* may be spaced out from each other, when secured to the U-shaped upright frame portion 250.

Figure 6:
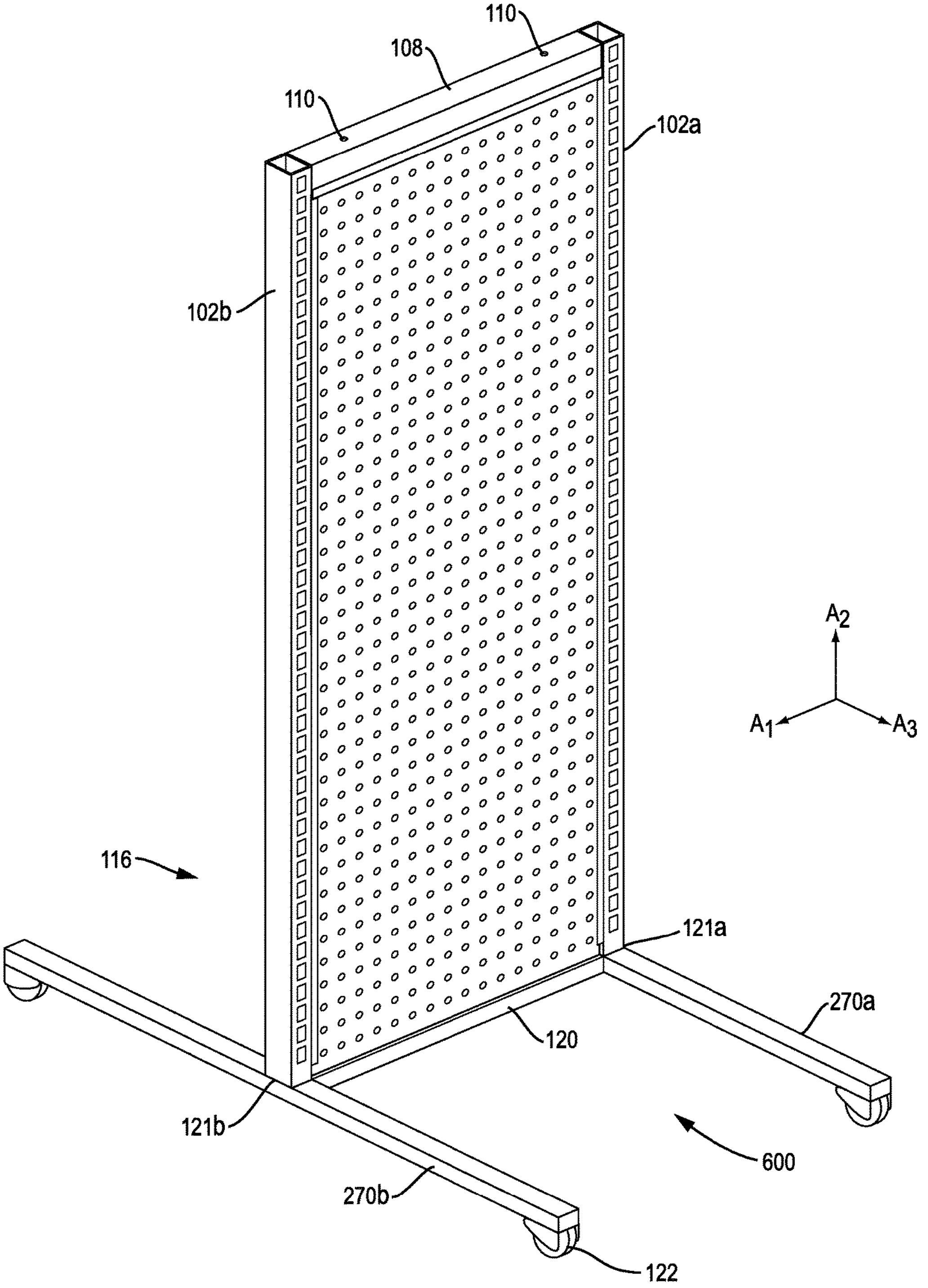
FIG. 6 illustrates a front perspective view of a partially assembled fixture having panels secured between opposing uprights of the free standing frame according to exemplary embodiments.

FIG. 6 illustrates a front perspective of a partially assembled fixture having panels secured between opposing uprights of the free standing frame according to exemplary embodiments with the wire rack omitted for clarity. In exemplary embodiments, the first and second panel 112*a-b* are locked at the top to the first and second uprights 102*a-b* and the elongated cap member 108. In exemplary embodiments, the spacing and position of the first and second panel 112*a-b* at the bottom of the fixture are maintained view the protruding member 230 on the elongated support member 120. In exemplary embodiments, the panels 112*a-b* can tempered hard boards or peg boards configured to receive hooks to display merchandise.

In some embodiments, the fixture can be formed without the flanges 210*a-b*. The first and second panels 112*a-b* can be inserted downwardly in the first and second set of grooves 220 and 222 and protruding member 230 of the U-shaped frame 124. The uprights 102*a-b* can be urged together to form a 90 degree angle with the elongated support member 120, securing the panels 112*a-b* in the groves 220 and 222 of the U-shaped frame 124. The elongated cap member 108 can be secured to the terminal ends of the uprights 102*a-b* to secure the first and second panel 112*a-b* and uprights 102*a-b* holding the first and second panels in place to store and display merchandise.

Figure 7:
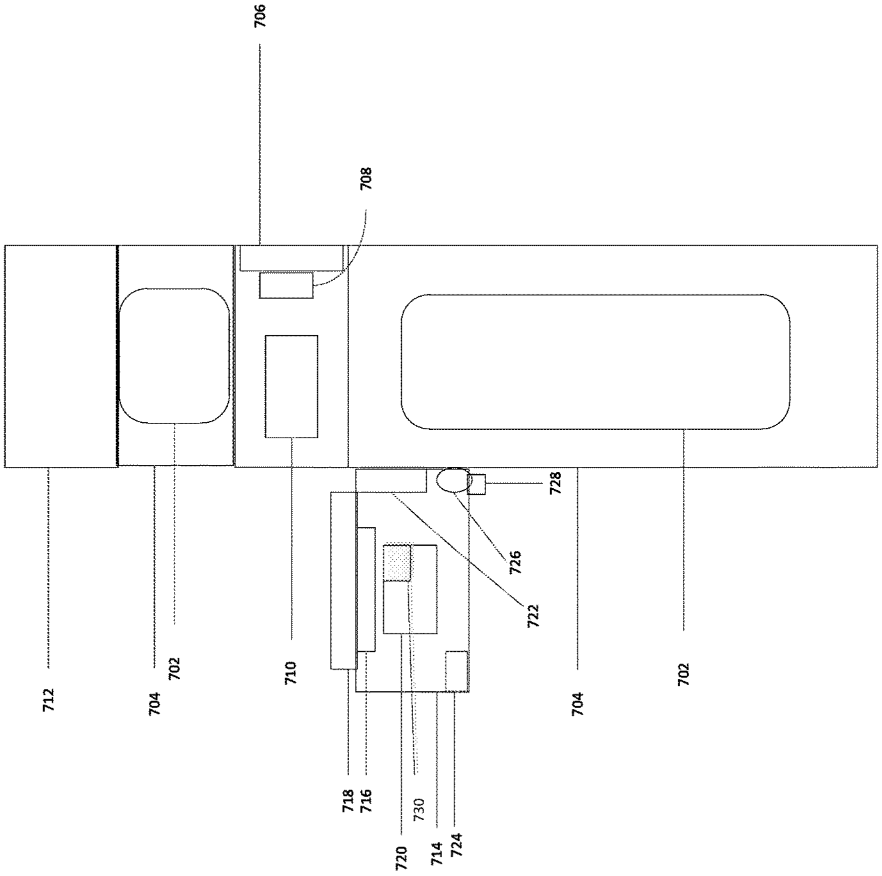
FIG. 7 is a block diagram showing a point-of-sale station including example point-of-sale components, according to example embodiments.
Figure 8:
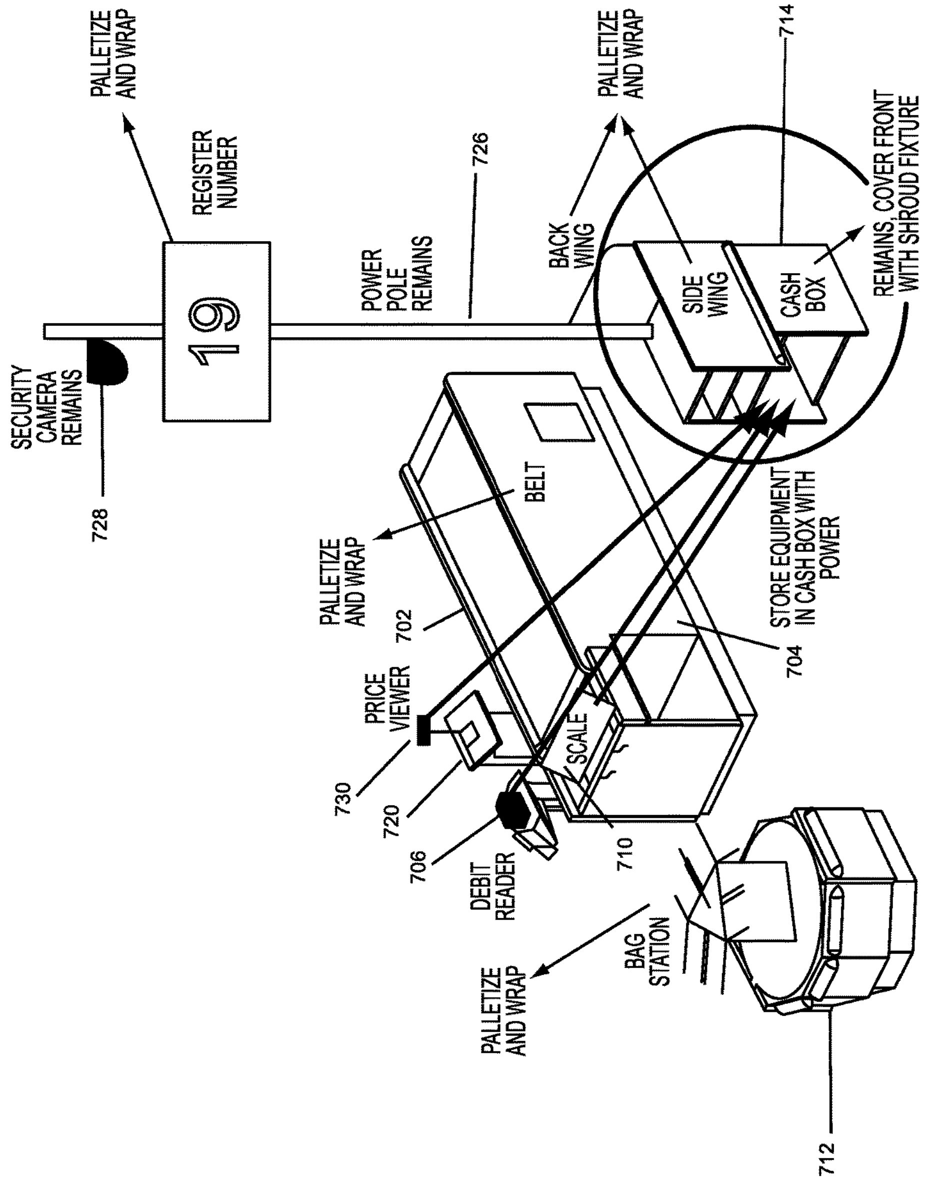
FIG. 8 illustrates example of point-of-sale station at least partially disassembled according to example embodiments.

FIGS. 7 and 8 illustrate a POS station 700 that includes POS components disposed on a sales floor of a physical retail store. FIG. 7 is a block diagram showing a plan view of the POS station 700 in an assembled state or form, according to an example embodiment. In the assembled state, the POS station 700 can be used by a cashier (or customers for self-service POS stations) to process transactions for customers. FIG. 8 is a perspective side view of the POS station 700 in a partially disassembled state or form, according to an example embodiment. In the disassembled state, the POS station is incapable of performing customer transaction (at least because some of the components of the POS station are removed or inaccessible in the stored disassembled state). At least some electronic terminal components of the POS station can be stored and secured in a non-electronic component of the POS station when the POS station is in its disassembled state. In the example shown in FIGS. 7 and 8, the POS station 700 includes belts 702, belt cabinets 704, a card reader 706, an optical scanner 708, a scale 710, a bagging station 712, a cash box 714, a keyboard 716, a cash drawer 718, a display 720, scan gun 722, receipt printer 724, a POS controller (e.g., shown in FIG. 8) disposed within the cash box 714, network and electricity conductivity pole 726, a security camera 728, and a customer display 730.

The belts 702 may be conveyer/endless belts disposed in the belt cabinets 704, which may also include rollers (e.g., friction and drive rollers) and a drive motor. The driver motor can control one or more of the rollers to rotate the belt to provide a transport for moving items from one end of the belt cabinet 704 to an opposite end of the belt cabinet 704. For example, one of the belts 702 can be driven to move items placed on the belt towards the optical scanner 708 and another one of the belts can be driven to move the item away from the optical scanner 708. The belt cabinets 704 can have a rectangular structure having side and bottom walls. Respective ones of the belts 702 can extend along a top portion of each of the belt cabinets 704. In addition, POS terminal components can be disposed on or in one or more of the belt cabinets 704. For example, in example embodiments, at least one of the belt cabinets 704 can support the card reader 706, the optical scanner 708, the scale 710, customer display 730, as well as any other suitable POS terminal components. The POS terminal components can be removably disposed on/in the belt cabinet 704. For example, when the POS station is disassembled, the card reader 706, the optical scanner 708, the scale 710, the customer display 730, as well as any other suitable POS terminal components, can be removed from the belt cabinet(s) 704, the belt cabinet 704(s) can be removed from the sales floor, and the POS terminal components can be stored in the cash box, as described herein.

The card reader 706 may be a magnetic card reader configured to read encoded information from magnetic stripes of payment cards. The magnetic reader may decode the encoded information and transmit the decoded information to the POS controller, or may in the alternative, transmit the encoded information to the POS controller, which may decode the encoded information. A customer or cashier may use the card reader to input tender information into the POS terminal to complete a purchase of one or more items by the customer. In example, embodiments, the card reader can include one or more microcontrollers and can execute reader firmware to implement one or more functions carried out by the card reader 706. The reader firmware can be updated from time-to-time to update an operation of the card reader 706. While an example embodiment has been illustrated as including a magnetic card reader, those skilled in the art will recognize that other types of readers can be utilized instead of, or in addition to, the magnetic card reader. For example, in example embodiments, the car reader can include near field communication (NFC) or Radio Frequency Identification (RFID) reader capability to wireless interact with a customer's payment type.

The optical scanner 708 may be a barcode scanning machine configured to read optical machine-readable representations. The optical scanner 708 can be configured to scan encoded information from machine-readable representations. The optical scanner 708 may decode the encoded information and transmit the decoded information to the POS controller, or may in the alternative, transmit the encoded information to the POS controller, which may decode the encoded information. A customer or cashier may use the optical scanner 708 to input item and/or loyalty/reward information into the POS terminal for use when processing a transaction for the customer. For example, the optical scanner 708 can be configured to scan barcodes or QR codes associated with items to be purchased by a customer and/or can scan customer loyalty/rewards cards/tags. In example embodiments, the optical scanner 708 can include one or more microcontrollers and can execute scanner firmware to implement one or more functions carried out by the optical scanner 708. The scanner firmware can be updated from time-to-time to update an operation of the optical scanner 708.

The scale 710 can be an electronic weighing machine configured to determine a weight of an object placed on the scale. In some embodiments, the scale can be an analog or digital scale that calculates the weight of objects using one or more strain gauges or other suitable devices that can convert a force applied to the scale by an object (e.g., from gravity) to an electrical signal. For example, the scale 710 can be used at the point-of-sale station to weigh an item to be purchased, where the price of an item depends on the weight of the item. A customer or cashier may use the scale 710 to input a weight of an item into the POS terminal to determine a price of the item. In example, embodiments, the scale 710 can include one or more microcontrollers and can execute weighing firmware to implement one or more functions carried out by the scale In addition, or in the alternative, the scale 710 may be calibrated, where such calibration can be controlled by the POS controller or by other device remote to the scale (e.g., a server operable coupled to the scale via a communication network).

The bagging station 712 disposed at the end of the POS station. The bagging station provides a structure for storing bags and an area that allows customers or employees to add scanned/purchased items into the bags.

The cashbox 714 is a structure that generally include side walls, a back wall, a top wall, and a front wall. An interior area of the cash box 714 may include a cavity space having one or more shelves for supporting components of the POS station and/or storing objects. When the POS station is in its assembled state (i.e. such that is configured to perform transactions), the cashbox generally supports one or more electronic terminal components, such as, for example, the POS controller, the keyboard 716, the cash drawer 718, the display 720, the scan gun 722, and the receipt printer 724. When the POS station is in its disassembled state, the interior of the cashbox can generally store one or more electronic terminal components, such as, for example, the POS controller, the card reader 706, the optical scanner 708, the scale 710, customer display 730, the keyboard 716, the cash drawer 718, the display 720, the scan gun 722, and the receipt printer 724. The cash box 714 can include a notch along it exterior (shown in FIG. 8) to accommodate the network and electricity pole 726 extending generally vertically up from the sales floor or down from the ceiling. The security camera 728 can be operatively coupled to the pole 726. Power and network connectivity can be provided to the components of the POS station via the pole 726.

The keyboard 716 can be operatively coupled to the POS controller and may be a multi-touch input system for customer to enter information onto the display 720. The keyboard provides functionality of I/O services receiving input from user input. In exemplary embodiments, when the POS station is in its assembled form, the keyboard 716 can be support on top of the cashbox 714. In some embodiments, the keyboard 716 can include an integrated card reader that allows a cashier to swipe a customer's card. In some embodiments, the keyboard 716 can include one or more microcontrollers (e.g., when it includes a card reader) and can execute firmware to implement one or more functions carried out by the keyboard 716. The firmware can be updated from time-to-time to update an operation of the optical scanner 708.

The cash drawer 718 may be a storage system for holding monetary funds customers use to pay for their transactions. The cash drawer can include an electromechanical lock and/or an electromagnetic lock to selectively lock and unlock the cash drawing in response to, for example, control signals received from the POS controller. For example, when a customer pays for a transaction with cash, the cashier can input the tender type and amount into the keyboard and the POS controller can process the input to transmit the control signal to the lock of the cash draw to allow the cash drawer to open and allow the cashier to place the money in the cash drawer and retrieve any change owed to the customer. In some embodiments, the cash drawer can be disposed in an interior area of the cashbox.

The display 720 and customer display 730 may be a computer monitor operatively coupled to the POS controller, and may display one or more graphical user interfaces generated by the POS controller. The graphical user interfaces can be rendered on the display to display information regarding items intended to be purchased along with information regarding completing the transaction and any other suitable information. In exemplary embodiments, when the POS station is in its assembled form, the display 720 and customer display 730 may be disposed on top of the cashbox 714.

The scan gun 722 may be a handheld optical scanning machine configured to read optical readable representations labeled on the products intended to be purchased. The scan gun 722 may be semi-portable where users can hold the scan gun and scan optical readable representations labeled on products without placing the products on the POS station. The scan gun 722 can be configured to scan encoded information from machine-readable representations. The optical scanner 708 may decode the encoded information and transmit the decoded information to the POS controller, or may in the alternative, transmit the encoded information to the POS controller, which may decode the encoded information. The scan gun 722 can be used to input item and/or loyalty/reward information into the POS terminal for use when processing a transaction for the customer. For example, the scan gun 722 can be configured to scan barcodes or QR codes associated with items to be purchased by a customer and/or can scan customer loyalty/rewards cards/tags. In example embodiments, the scan gun 722 can include one or more microcontrollers and can execute scan gun firmware to implement one or more functions carried out by the scan gun 722. The scan gun firmware can be updated from-time-to-time to update an operation of the scan gun 722.

The receipt printer 724 may be a printer configured to print receipts for completed customer transactions. When the POS station is in its assembled form, the receipt printer can be supported by the cash box 714 and can be operatively coupled to the POS controller. The POS controller can send information and instructions to the receipt printer 724 to instruct the receipt printer to print receipts for transactions. In example embodiments, the receipt printer can include one or more microcontrollers and can execute printer firmware to implement one or more functions carried out by the receipt printer 724. The printer firmware can be updated from time-to-time to update an operation of the receipt printer 724.

The network and electricity pole 726 can extend generally vertically from the sales floor and/or from the ceiling and can form a conduit through which power and network cables can be routed to the POS station to provide electricity and network connectivity to one or more of the terminal components. The network and electricity pole 726 positioned adjacent to the cash box 714 and the power and network cables may be routed from the pole 726 to and through the cash box 714. For example, in exemplary embodiments, the cash box 714 can include a vertically extending notch configured to receive or accommodate the pole 726. One or more of the terminal components of the POS station can be configured to receive software updates via the network cable and/or may be configured to transmit their status to a remote server in communication with the terminal components over communication network via the network cable.

The security camera 728 may be a video camera configured recording video of the POS station and/or areas around the POS station. The security camera 728 may be coupled to the network and electricity pole 726. The security camera 728 can receive electricity from the power cable routed through the conduit of the pole 726 and can transmit video captured by the camera 728 via the network cable routed through the conduit of the pole 726

In an exemplary operation of the POS station in the assembled state or form, a customer can process and complete their transaction for merchandise intended for purchase using the POS station 700. Items for purchase can be placed on one of the belts 702 and can be transported towards the optical scanner. The POS station 700 can optically read the barcode on the merchandise using the optical scanner 708 or the scan gun 722. The POS station 700 can display the price of the merchandise identified by optically reading the barcode on the customer display 730. The POS station 700 can complete the transaction by accepting customer payment using the card reader 706 and printing a receipt of the transaction for the customer using the receipt printer 724. After an item is scanned, the item is place on another one of the belts to transport the item to the bagging station 712.

In exemplary embodiments, in the disassembled state or form, the non-electronic components of the terminal can be removed from the POS station and the sales floor, leaving the cash box 714 secured to the sales floor and the pole 726 in place. The POS controller, the card reader 706, the optical scanner 708, the scale 710, customer display 730, the keyboard 716, the cash drawer 718, the display 720, the scan gun 722, and the receipt printer 724 can be placed in the interior of the cash box 714 for storage, while maintaining power and network connectivity provided via the pole. While being stored in the cash box 714, the POS controller, the card reader 706, the optical scanner 708, the scale 710, customer display 730, the keyboard 716, the cash drawer 718, the display 720, the scan gun 722, and the receipt printer 724 can remain powered-on via the power cable routed through the pole 726 and can be connected to a communication network via the network cable routed through the pole 726. The POS controller, the card reader 706, the optical scanner 708, the scale 710, customer display 730, the keyboard 716, the cash drawer 718, the display 720, the scan gun 722, and/or the receipt printer 724 can receive software updates and/or modification in their stored state such that when the POS station is reassembled, the POS controller, the card reader 706, the optical scanner 708, the scale 710, customer display 730, the keyboard 716, the cash drawer 718, the display 720, the scan gun 722, and/or the receipt printer 724 can have current or up-to-date software.

Figure 9:
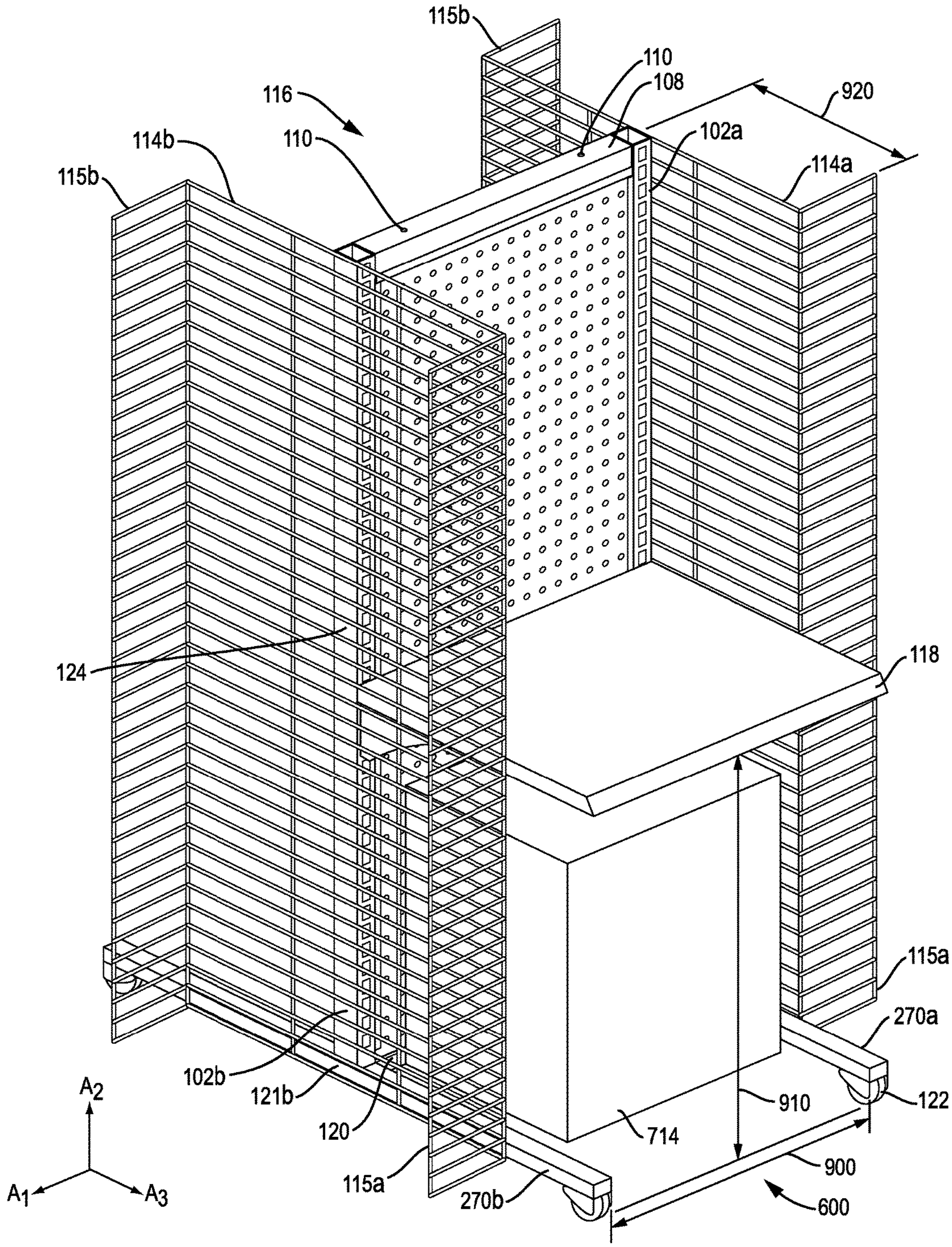
FIG. 9 illustrates an exemplary embodiment of the fixture positioned adjacent to a cashbox of a disassembled point-of-sale station according to example embodiments.

FIG. 9 illustrates the two-way fixture encompassing the cash box according to exemplary embodiments. The fixture 100 can be configured to wholly or partially receive the cashbox 714 in a first volume 116 or a second volume 600. In exemplary embodiments, the wire frames 114*a-b*, the shelves 118 and the elongated support members 270*a-b* of the I shaped frame create the volume 116 and 600 that has a depth that corresponds to a width or length of a cashbox 714 of a Point-of-Sale (POS) station such that when the first panel or second panel 112*a-b* is positioned adjacent to the cash box 714. The first or second volume 116 or 600 may be configured to partially or completely receive the cash box so that the cash box is only partially visible. In exemplary embodiments, a width 900 of the second volume 600 and the first volume 116 extends along the first axis $A_1$ in between the elongated support members 270*a-b*. A height 910 of the second volume 600 (and the first volume 116) can extend along the second axis $A_2$ in-between the shelf 118 and the sales floor. A depth 920 of the second volume 600 (and the first volume 116) can extend along the third axis $A_3$ from the first end 115*a* of the wire racks 114*a-b* to the first or second upright 102*a-b*. Alternatively, the depth of the first volume 116 may extend along the third axis $A_3$ from the second end 115*b* of the wire racks 114*a-b* to the first or second upright 102*a-b*. In exemplary embodiments, the fixture 100 may be transported along the sales floor using the wheels 122. The fixture 100 may receive the cash box in the volume 116 by moving the fixture 100 laterally along the sales floor until the cashbox is disposed adjacent to one of the panels 112*a* or 112*b*.

Figure 10:
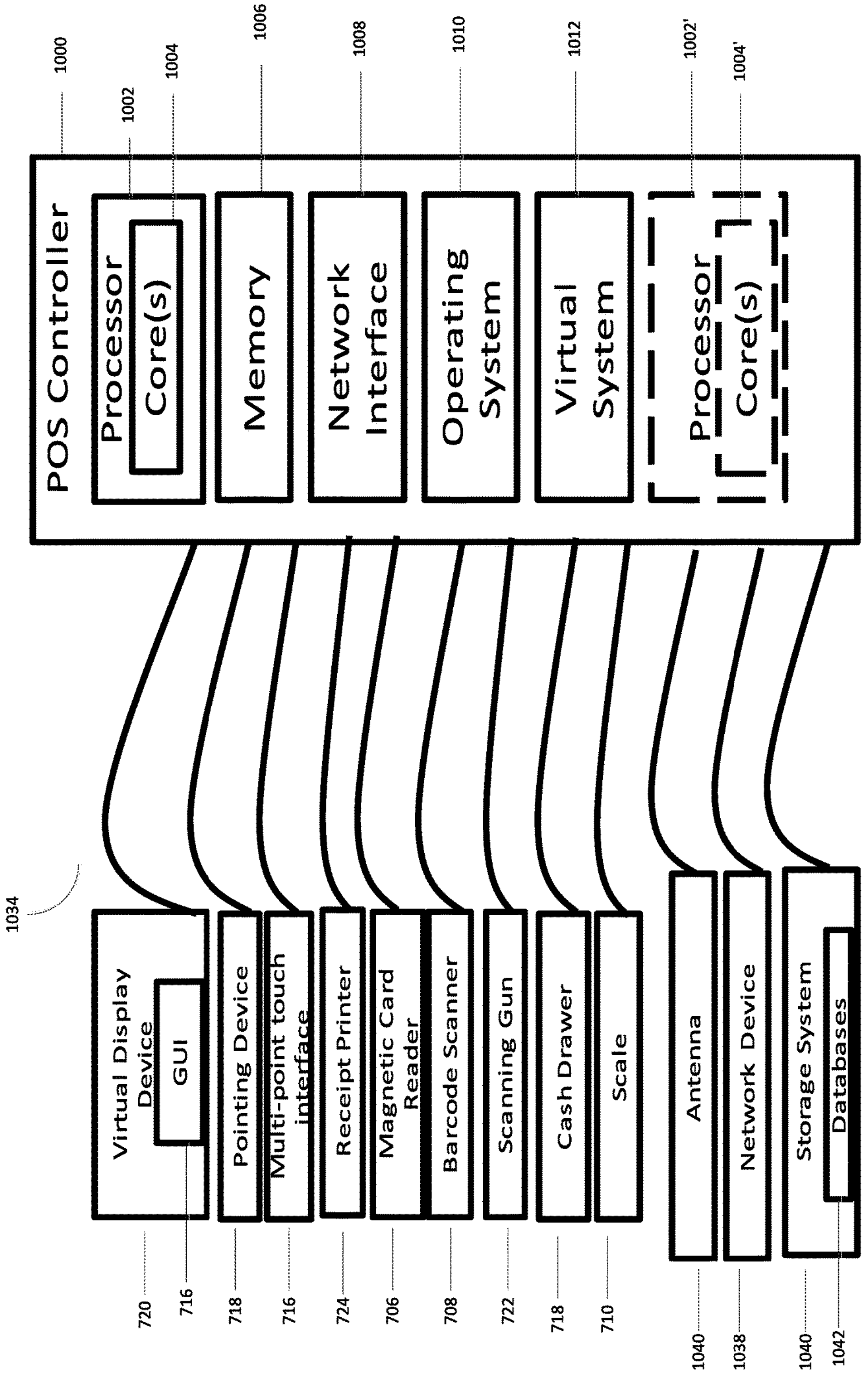
FIG. 10 is a block diagram of an example point-of-sale terminal of a point-of-sale station in accordance with example embodiments of the present disclosure.

FIG. 10 is a block diagram of a point-of-sale terminal 1034 including an example POS controller 1000 that may be used to implement exemplary operations of the point-of-sale terminal at a POS station in accordance with the present disclosure. The POS controller 1000 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 1006 included in the POS controller 1000 may store computer-readable and computer-executable instructions or software for implementing exemplary operations of the point-of-sale terminal. The POS controller 1000 also includes configurable and/or programmable processor 1002 and associated core(s) 1004, and optionally, one or more additional configurable and/or programmable processor(s) 1002' and associated core(s) 1004' (for example, in the case of computer systems having multiple processors/cores), for executing computer-readable and computer-executable instructions or software stored in the memory 1006 and other programs for controlling terminal components operatively coupled to the POS controller 1000. Processor 1002 and processor(s) 1002' may each be a single core processor or multiple core (1004 and 1004') processor.

Virtualization may be employed in the POS controller 1000 so that infrastructure and resources in the POS controller may be shared dynamically. A virtual machine 1012 may be provided to handle a process running on multiple processors so that the process appears to be using only one computing resource rather than multiple computing resources. Multiple virtual machines may also be used with one processor.

Memory 1006 may include a computer system memory or random access memory, such as DRAM, SRAM, EDO RAM, and the like. Memory 906 may include other types of memory as well, or combinations thereof.

A user (e.g., a cashier) may interact with the POS controller 1000 through components of the point-of sale terminal 1034 that are operatively coupled to the POS controller 1000 including, a visual display device 1020, such as a computer monitor, which may display one or more graphical user interfaces 1016. The POS controller 1000 may include other I/O devices for receiving input from a user, for example, the card reader 1006, the optical scanner 1009, the scale 1010, customer display 1030, the keyboard 1016, the cash drawer 1018, the scan gun 1022, and/or the receipt printer 1024, as described herein. The POS controller 1000 may include other suitable I/O peripherals.

The POS controller 1000 may also include one or more storage devices 1040, such as a hard-drive, CD-ROM, or other computer readable media, for storing data and computer-readable instructions and/or software that implement exemplary of the point-of-sale terminal. Exemplary storage device 1040 may also store one or more databases for storing any suitable information required to implement exemplary embodiments. For example, exemplary storage device 1040 can store one or more databases 1042 for storing information such as transaction information, cashier information, product information, and/or any other suitable information. The databases may be updated manually or automatically at any suitable time to add, delete, and/or update one or more data items in the databases.

The POS controller 1000 can include a network interface 1008 configured to interface via one or more network devices 1038 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 1040 to facilitate wireless communication (e.g., via the network interface) between the POS controller 1000 and a network. The network interface 1008 may include a built-in network adapter, network interface card, PCMCIA network card, card bus network adapter, wireless network adapter, USB network adapter, modem or any other device suitable for interfacing the POS controller 1000 to any type of network capable of communication and performing the operations described herein. In exemplary embodiments, the POS controller can be operatively coupled to a communication network via a network cable routed through the pole 726 (FIG. 7).

The POS controller 1000 may run any operating system 1010, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the POS controller and performing the operations described herein. In exemplary embodiments, the operating system 1010 may be run in native mode or emulated mode. In an exemplary embodiment, the operating system 1010 may be run on one or more cloud machine instances.

Figure 11:
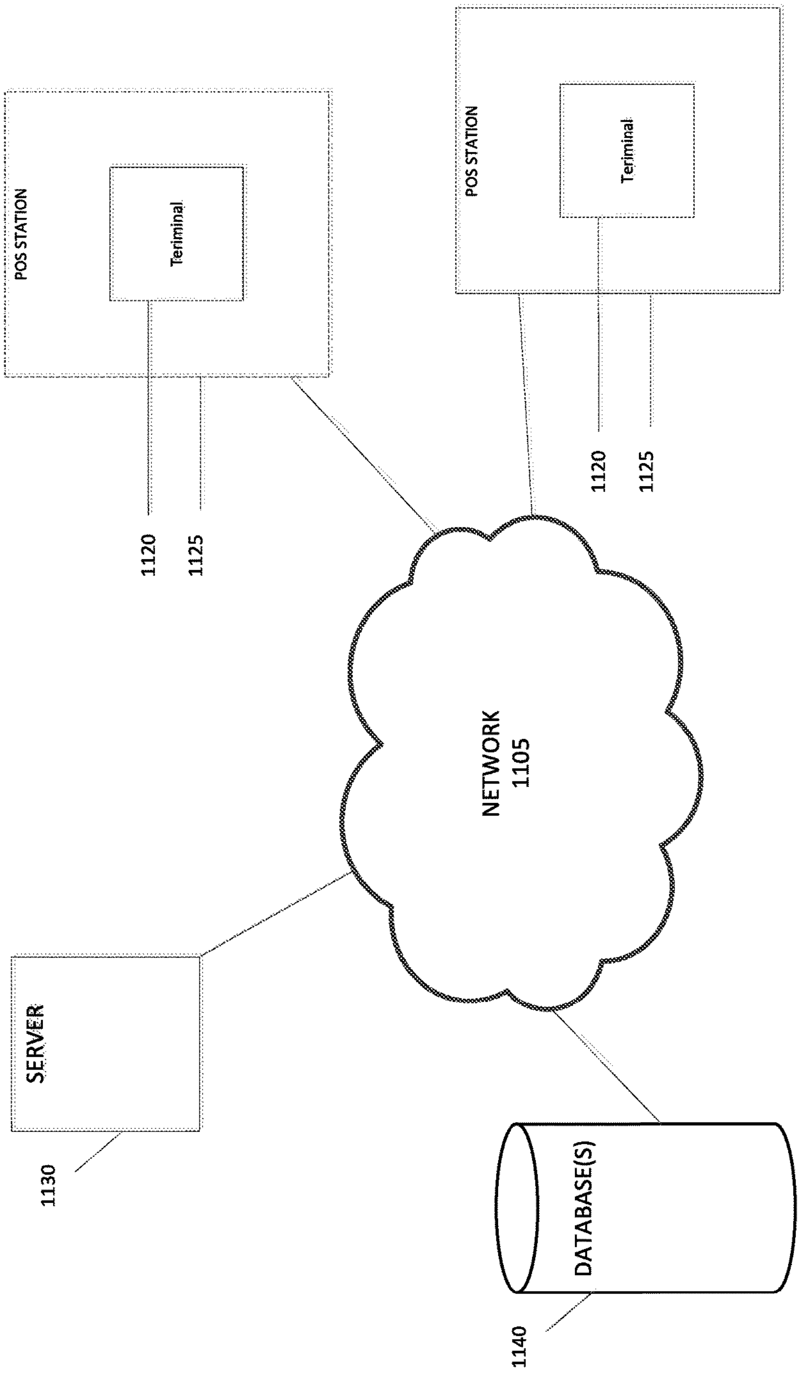
FIG. 11 illustrates an exemplary environment through which electronic point-of-sale terminal components communicate with other devices.

FIG. 11 illustrates a network diagram depicting a POS system 1100. The system 1100 can include a network 1105, POS terminals 1120 at POS stations 1125, a server 1130, and database(s) 1040. Each of the POS terminals 1120, server 1130, and databases 1140 is in communication with the network 1105.

In an example embodiment, one or more portions of network 1105 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The POS terminal 1120 may connect to network 1105 via a wired or wireless connection. The POS terminal 1120 may include one or more applications or systems such as, but not limited to, a sales transaction application, a cashier performance application, a customer review application, a user interface application, a checkout lane parameter system, and the like. In an example embodiment, the POS terminal 1120 may perform all the functionalities described herein.

Each of the server 1130 and database(s) 1140 is connected to the network 1105 via a wired connection. Alternatively, one or more of the server 1130 and databases 1140, may be connected to the network 115 via a wireless connection. Server 1130 includes one or more computers or processors configured to communicate with POS terminal 1120 and database(s) 1130, via network 1105. Server 1130 hosts one or more applications configured to interact with one or more components of the POS terminal 1120 and/or facilitates access to the content of database(s) 1140. Database(s) 1140 comprise one or more storage devices for storing data and/or instructions (or code) for use by server 1130 and POS terminal 1120. Database(s) 1140 and server 1130 may be located at one or more geographically distributed locations from each other or from POS terminal 1120. Alternatively, database(s) 1140 may be included within server 1130.

In exemplary embodiments software updates can be provided to the electronic components of the POS terminal 1120, via the network 1105 and through a network cable routed through the pole 726 (FIG. 7) that is operatively coupled to the network 1105. The software updates can be provided in the form of software update files such as batch files transferred from the server 1130 through the network 1105 to the electronic components of the POS terminals 1120. The batch files can update a single or multiple electronic components of the POS terminals 1120. In exemplary embodiments, a load file, an executable, swap file and command file can be used to update the software of the electronic components of the POS terminals 1120. In some instances, one or more of the POS station 1125 can be in the assembled state when it receives software updates and/or one or more of the POS stations 1125 can be in the disassembled state when it receives software updates. In exemplary embodiments, regardless of the state of the POS station the electronic components of the POS terminals 1120 can be updated in accordance with embodiments of the present disclosure.

Figure 12:
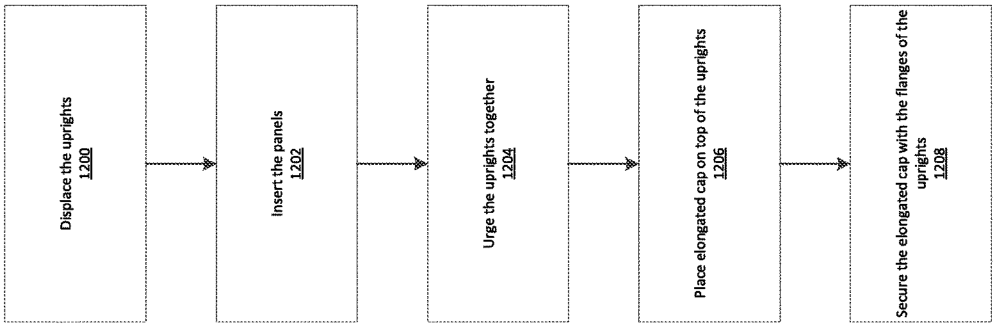
FIG. 12 is a flowchart illustrating an example process for assembling a fixture according to embodiments of the present disclosure.

FIG. 12 is a flowchart illustrating an example process for assembling a fixture according to embodiments of the present disclosure. In exemplary embodiments, in operation 1200, the uprights 102*a-b* are displaced. Before displacing the uprights 102*a-b* can be at a 90 degree angle with the elongated support member 120 and after displacing the uprights 102*a-b* the uprights create more than 90 degree angle with the elongated support member 120. In some embodiments, the displacement of the uprights can occur naturally when the terminal ends of the uprights are not secured to each other (e.g., can be naturally displace due to gravity). In operation 1202, the panels 112*a-b* are placed into the slots 220 of the U-shaped frame 124. In exemplary embodiments, the first panel 112*a* is placed into the first pair of slots 221*a* and 223*b* and the second panel 112*b* is placed into the second pair of slots 221*b* and 223*b*. In exemplary embodiments, the first and second panel 112*a-b* may rest along the protruding member 230 of the elongated bottom support member 120. In operation 1204, the uprights 102*a-b* are urged together (e.g., so that they are at a 90 degree angle with the elongated bottom support member 120). In operation 1206, an elongated cap member 108 is placed on top of the uprights 102*a-b* and first and second panels 112*a-b*, securing the U-shaped frame 124 and the first and second uprights 102*a-b* together. In some embodiments, the first flanges 210*a* can be inserted into the first end of the elongated cap member 108 and the second flange 210*b* can inserted into the second end of elongated cap member 108. In exemplary embodiments, apertures 240 of the first and second flanges 210*a-b* and apertures 110 of the elongated cap member 108 are aligned. In operation 1208, the elongated cap member 108 is secured to the first and second flanges 210*a-b*, via screws inserted in the apertures 110 and apertures 240.

Figure 13:
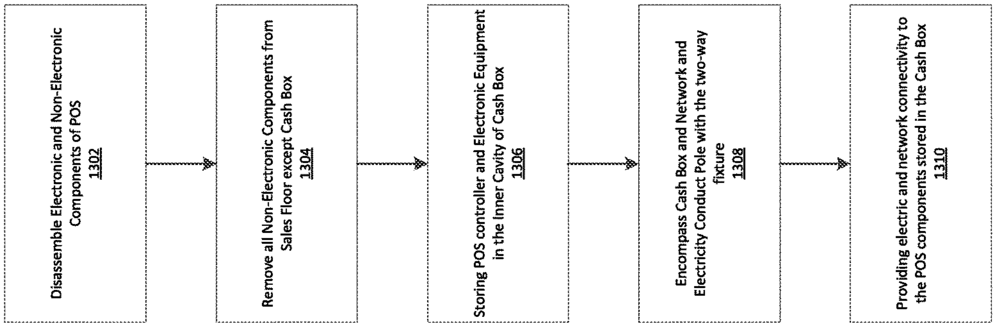
FIG. 13 is a flowchart showing the example process for disassembling the point-of-sale station, storing the components and obscuring the cash box with a fixture according to exemplary embodiments.

FIG. 13 is a flow chart showing the example method for disassembling the point-of-sale station, storing the components and covering the cash box with a two- way fixture. In an example embodiment, in operation 1302, the POS station is disassembled and all the non-electronic and terminal components of the POS station are decoupled from each other and removed from their positions, with the exception of the cash box which can remain the same position in both the assembled and disassembled states. The non-electronic components may include but are not limited to: a belt 702, belt cabinet 704, and bagging station 712. The terminal components include but are not limited to the card reader 706, the optical scanner 708, the scale 710, customer display 730, the keyboard 716, the cash drawer 718, the display 720, the scan gun 722, and the receipt printer 724 (FIGS. 7 and 8). The network and electricity conductivity pole 526 may remain coupled to the cash box 714. The security camera 728 may stay coupled to the network and electricity pole 726.

In operation 1304 all of the non-electronic except for the cash box 714 are removed from the sales floor. The non-electronic components, such as a belt 702, belt cabinet 704 and bagging station are cleared from the sales floor and stored in storage. The removal of these non-electronic components creates space on the sales floor. The cash box 714 along with the network and electricity pole 726, and security camera 728 remain on the sales floor. The network and electricity pole 726 remains resting in the hollow opening of the cash box 714 and the security camera 728 remains coupled to the network and electricity pole 726.

In operation 1306, all of the terminal components are stored in the inner cavity of the cash box. The open front face of the cashbox can be covered by a shrud to secure the components within the cavity. The terminal components stored within the cash box may include but are not limited to, card reader 706, barcode scanner 708, scale 710, keyboard 716, cash drawer 718, display 720, scan gun 722, receipt printer 724, network and electricity conductivity pole 726, and security camera 728. The terminal components may be placed on the shelf like system inside the inner cavity of the cash box 714 according to the size and special necessities of the terminal component. All of the terminal components may be stored within the cash box in a decoupled manner.

In operation 1308, the two way fixture 100 can be slide towards the cashbox 714 so that the cashbox 714 is received by the first volume 116 or second volume 600 (FIG. 6) of the two way fixture 100. In an example embodiment, the two way fixture 100 receive the cash box 714 by sliding the fixture laterally with respect to the cash box 714 and network and electricity conduct pole 726 secured to the sales floor so that the first volume 114 or the second volume 600 receives the cash box and the network and electricity pole and the cashbox 714 is disposed adjacent to one of the panels of the fixture.

In operation 1310, the terminal components stored within the cash box 714 remain connected to the network and electricity pole 726. The network and electricity pole 726 remains in place and provides a conduit through which power and network connectivity passes into the cash box 714. This provides the ability for the terminal components to stay updated with the latest software updates along with powered on to complete the software updates.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

The invention claimed is:

1. A fixture for holding and displaying merchandise while concealing a portion of a point-of-sale (POS) station assembly, the POS assembly including a POS controller, one or more peripheral electronic components in communication with the POS controller, and a plurality of non-electronic components, the plurality of non-electronic components including a cashbox secured to a sales floor and having opposing side walls, a back wall, and a top wall defining an interior cavity accessible via an open front face of the cashbox, the fixture comprising:

a free standing frame formed by:
- (i) an elongated bottom support member having a length extending along a first axis from a first end to a second end;
- (ii) a first upright extending perpendicularly from the first end of the elongated bottom support member to a first terminal end along a second axis that is perpendicular to the first axis, the first upright including a first pair of slots formed on the first upright between the first end and the first terminal end;
- (iii) a second upright extending perpendicularly from the second end of the elongated bottom support member to a second terminal end along the second axis, the second upright including a second pair of slots formed on the second upright between the second end and the second terminal end;

a first wire rack mounted to an outer side of the first upright opposite the first pair of slots;

a second wire rack mounted to an outer side of the second upright opposite the second pair of slots, wherein the elongated bottom support member, the first upright and the second upright reside in a first plane and define first and second volumes on opposite adjacent sides of the free standing frame;

wherein the first pair of slots are opposingly spaced with respect to the second pair of slots, and wherein, the POS assembly is disassembled to be in a disassembled state, and in the disassembled state the cashbox of the POS assemble remains on the sales floor while the remainder of the plurality of non-electronic components are removed from the sales floor and the POS controller and the one or more electronic components are stored in the interior cavity of the cashbox, and the fixture is disposed with respect to the cash box and a network and electricity pole secured to the sales floor so that the first volume or the second volume receives the cash box and the network and electricity pole such that the cash box is completely disposed within the first or second volume.

2. The fixture of claim 1, wherein the elongated bottom support member, the first upright, and the second upright define a U-shaped configuration.

3. The fixture of claim 2, wherein the elongated bottom support member, defines a base configured to provide support to the U-shaped frame.

4. The fixture of claim 1, further comprising a first panel received by a first one of the slots of the first pair of slots and a first one of the slots of the second pair of slots; and a second panel received by a second one of the slots of the first pair of slots and a second one of the slots of the second pair of slots.

5. The fixture of claim 4, further comprising:

an elongated cap member configured to be secured to the first terminal end of the first upright and the second terminal end of the second terminal upright, wherein the first and second pairs of slots of the first and second uprights and the elongated cap member secure the first and second panels to the free standing frame.

6. The fixture of claim 5, wherein the first panel comprises a peg board.

7. The fixture of claim 1, further comprising:

a shelf removably secured to and spanning the first and second uprights, the shelf width corresponding to a distance between the first and second uprights and having a depth that corresponds to a width or length of the cashbox.

8. The fixture of claim 1, wherein the POS controller and the one or more peripheral electronic components stored in the cashbox receive electricity and network connectivity via the electrical conduit to keep the POS controller and the one or more peripheral electronic components stored in the interior cavity of the cashbox connected to electricity and to a network when the POS assembly is in the disassembled state.

9. A fixture comprising:

an I-shaped base portion;

a U-shaped upright frame portion, the U-shaped upright frame portion having a first wire rack disposed on a first outer edge of the U-shaped upright frame portion and a second wire rack disposed on a second outer edge of the U-shaped upright frame portion, the U-shaped upright frame portion including opposingly spaced first and second uprights, a first panel;

a second panel;

an elongated cap member configured to be secured to terminal free ends of the first and second uprights;

wherein, at least one of the first or the second upright is displaced outwardly away from each other to receive the first panel which is inserted between the first and second uprights and in a first set of opposing spaced slots formed on the first and second uprights and the second panel which is inserted between the first and second uprights and in a second set of opposing spaced slot slots formed on the first and second uprights, wherein upon receiving the first and second panels, the first and second uprights are urged towards each other so that the first and second panels engage the first and second pairs of slots, respectively, and wherein the elongated cap member is secured to terminal free ends of the first and second uprights to secure the first and second panels to the U-shaped upright frame portion.

10. The fixture of claim 9, wherein the first and second panels are parallel to each other when they are secured to the U-shaped upright frame portion.

11. The fixture of claim 10, wherein the first and the second panels are spaced away from each other.

12. The fixture of claim 9, the first upright includes a first plurality indexed apertures and the second upright includes a second plurality of apertures, and the method further comprises securing a shelf to the first upright and the second upright, a portion of the shelf being received by one of the first plurality of indexed apertures and one of the second plurality of indexed apertures.

13. The fixture of claim 12, wherein a first wire rack is mounted to the first upright and a second wire rack is mounted to the second upright.

14. The fixture of claim 12, wherein the fixture is positioned in proximity a cash box of a disassembled Point-of-Sale (POS) station so that the first panel is disposed adjacent to the cash box, wherein the first and second wire racks and the shelf obscure the cash box.

15. The fixture of claim 9, wherein each of the first and second panels are configured to receive one or more hooks for displaying merchandise.

* * * * *